Aug. 21, 1945.  E. A. JENKINS  2,383,196
SLACK ADJUSTING DEVICE
Filed March 20, 1944  2 Sheets-Sheet 1

Ernest A. Jenkins  Inventor

By Jack A. Schley
Joseph H. Schley
Attorneys

Aug. 21, 1945.  E. A. JENKINS  2,383,196
SLACK ADJUSTING DEVICE
Filed March 20, 1944  2 Sheets-Sheet 2
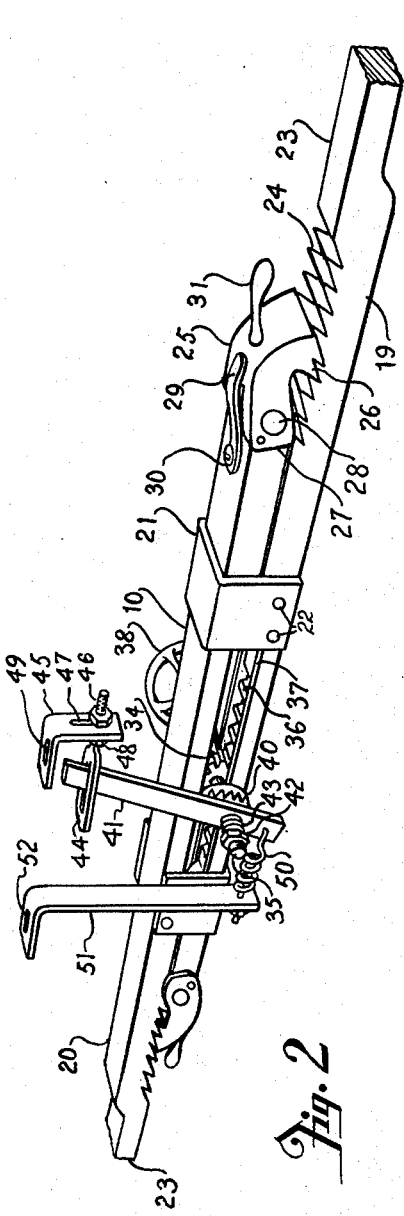
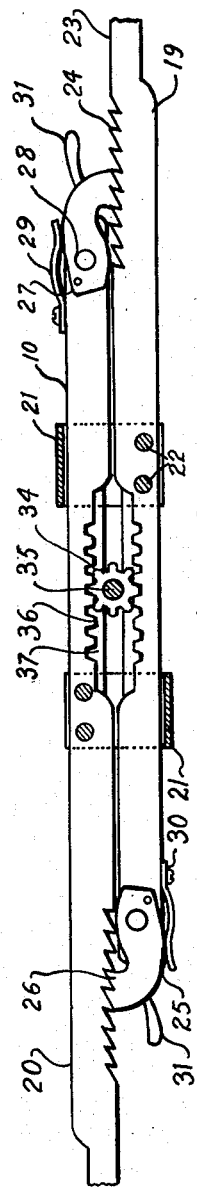
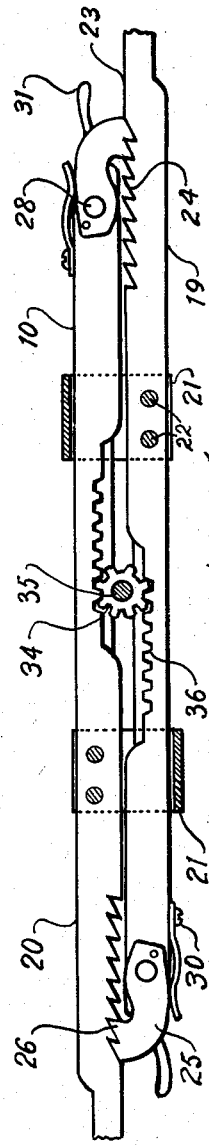
Ernest A. Jenkins, Inventor Patented Aug. 21, 1945

2,383,196

UNITED STATES PATENT OFFICE 2,383,196

SLACK ADJUSTING DEVICE

Ernest A. Jenkins, Waco, Tex.

Application March 20, 1944, Serial No. 527,329

4 Claims. (Cl. 188—198)

This invention relates to new and useful improvements in slack adjusting devices.

One object of the invention is to provide improved means for taking up the slack of a movable member and which is primarily adapted for use in adjusting the length of brake equalizing rods and similar longitudinally movable rods.

A particular object of the invention is to provide an improved slack adjusting device adapted to be used in connection with a brake rod or other reciprocal actuating member for automatically compensating for wear of the brake shoes or other actuated means, the device being operated by the reciprocation of the rod and being inoperative when no wear occurs so as to require only infrequent manual setting.

An important object of the invention is to provide an improved slack adjusting device which is adapted to automatically take up the slack in a reciprocal member, such as a brake rod, during reciprocation of the member, whereby the necessity of manually adjusting the length of said member under normal operating conditions is rendered unnecessary.

Another object of the invention is to provide an improved slack adjusting device, of the character described, having a pair of adjustably-connected sections normally reciprocal as a unit and adapted to undergo longitudinal movement relative to each other when reciprocated as a unit in one direction beyond a predetermined distance, there being means having connection with each section for automatically effecting such relative longitudinal movement.

A further object of the invention is to provide an improved slack adjusting device, of the character described, having a take-up arrangement associated therewith for automatically shortening the length of said device when the same is moved in one direction beyond a predetermined distance, the take-up arrangement being actuated upon movement of said device in such direction so as to shorten its length upon reverse movement thereof to its original or normal position.

A construction designed to carry out the invention will be hereinafter described together with other features of the invention.

Figure 1:
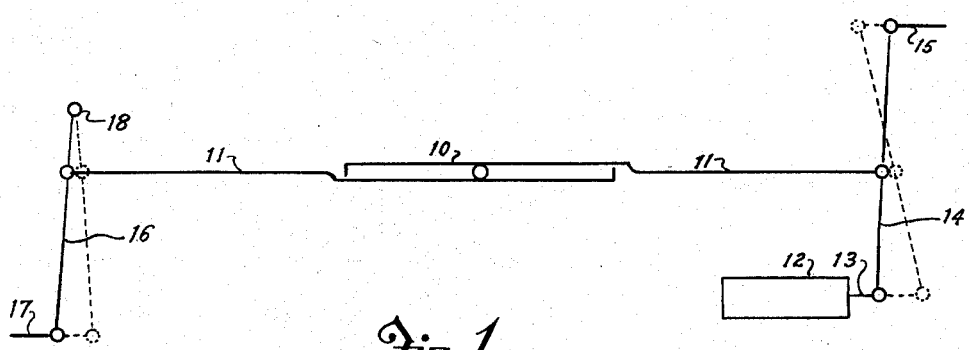
Figure 6:
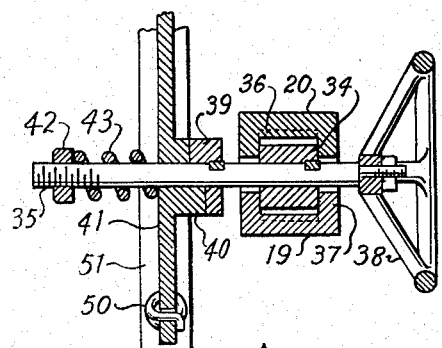
Figure 7:
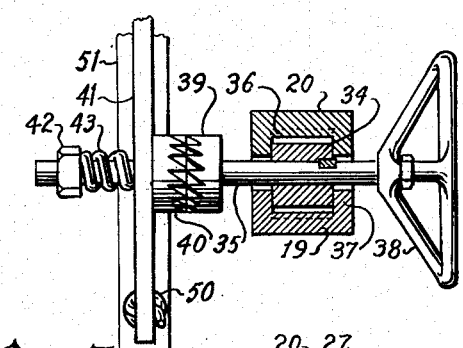
Figure 5:
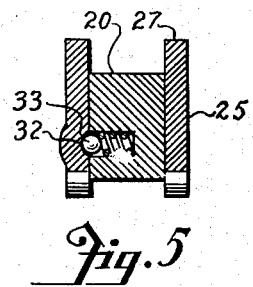
Figure 8:
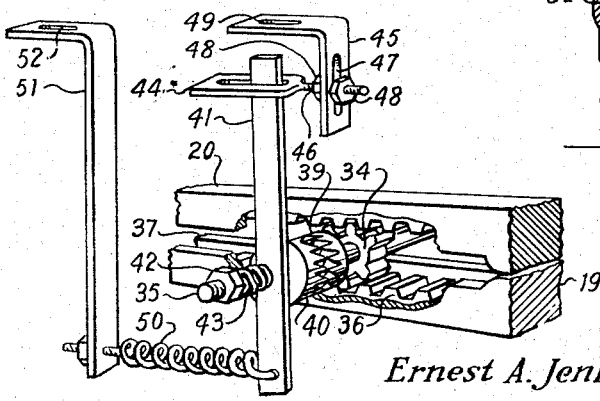

The invention will be more readily understood from a reading of the following specification and by reference to the accompanying drawings, wherein an example of the invention is shown, and wherein:

Figure 1 is a schematic view of the braking system of a railroad car having a slack adjusting device, constructed in accordance with the invention, connected in the equalizer rod, Figure 2 is an isometric view of the slack adjusting device, Figure 3 is an elevation of the device with its sections in an intermediate position, Figure 4 is a view, similar to Figure 3, showing the relation of the sections when the device is in full take-up position, Figure 5 is an enlarged, transverse, vertical sectional view of the outer end of one of the sections, Figure 6 is an enlarged, transverse, vertical, sectional view of the device, Figure 7 is a view, similar to Figure 5, showing the relation of the parts upon longitudinal movement of the device, and Figure 8 is an enlarged, isometric view of the central portion of the device in the same relative position as illustrated in Figure 7.

In the drawings, the numeral 10 designates a slack adjusting device which is adapted to be connected in the equalizer rod 11 of the usual braking system in use on railroad cars. As shown in Figure 1, the system includes an air-actuated piston 12 which has its rod 13 pivotally connected by a transverse rod 14 and a longitudinal rod 15 to the usual brake shoes (not shown) of one truck of the railroad car. One end of the equalizer rod 11 is fastened to the intermediate portion of the transverse rod 14, while another transverse rod 16 has similar connection with the opposite end of said equalizer rod. A longitudinal rod 17 pivotally connects the brake shoes (not shown) of the other truck to one end of the rod 16, which rod has its opposite end pivotally secured to the underside of the railroad car as shown at 18. The latter is the only point of positive connection between the rods of the braking system and the railroad car. Upon actuation of the piston 12 to apply the brakes, the parts of the system will assume the position shown in dotted lines with the device 10 moving to the right as a unit with the equalizer rod 11 and all of said parts pivoting from the point 18. As will be hereinafter explained, the device 10 is adapted to shorten the length of the equalizer rod 11 upon excessive movement thereof due to wear of the brake shoes so as to prevent excessive movement or throw of the piston 12.

As is clearly shown in Figure 2, the slack adjusting device includes a pair of overlapping, parallel sections or members 19 and 20 which are of identical construction. The members preferably have the form of flat rods, rectangular in cross-section, being held contiguous to each other in longitudinal alinement by a pair of U-shaped brackets or keepers 21. One bracket has its parallel legs or flanges secured by rivets 22 to the intermediate portion of each member with its closed end projecting from said member for receiving the other member, whereby the members are held together against lateral displacement without preventing relative longitudinal movement thereof. The outer or free end of each member may be reduced in thickness as shown at 23 and may be connected in any suitable manner to the adjacent section of the equalizer rod 11. As will be hereinafter more fully explained, the members may be in the same vertical or horizontal plane.

For releasably connecting the members 19 and 20 to each other so that the same will move together as a unit with the equalizer rod, a plurality of parallel serrations or ratchet teeth 24 are formed in the contiguous surface of each member adjacent its outer end. Each tooth 24 extends transversely across its member and is directed longitudinally, outwardly thereof. A pawl or latch 25, having a curved outer end portion with complementary ratchet teeth 26 formed on its innermost surface for engaging the teeth 24, is pivotally secured to the overlapping inner end of each member by means of a yoke 27 which is formed by increasing the width of and bifurcating the inner end portion of the latch element. The inner end of the member engages within the recess of the yoke 27 and a pivot pin 28 extends transversely through said member and the legs of said yoke to pivotally connect the latch 25 to the member. A flat spring 29, secured to the outer surface of the member by a suitable screw 30, overlies the outer surface of the latch 25 for resiliently maintaining its teeth 26 in engagement with the teeth 24 of the other member. Since each member is connected to the other member in the manner described hereinbefore, it is manifest that the members will reciprocate together as a unit with the equalizer rod 11. However, due to the resilient, pivotal connection of the latches, said members may be moved longitudinally relative to each other.

In order to permit manual movement of the members relative to each other, a finger lift 31 is secured to the outer surface of each latch 25 for swinging the same outwardly and thereby moving its teeth 26 out of engagement with the teeth 24. For holding the latch in its outward position, a recess 32 is formed in the internal surface of one of the legs of the yoke 27 and is adapted to be engaged by a spring-pressed ball 33 which is mounted in the contiguous surface of the member as shown in Figure 5. The ball 33 is normally spaced from and out of engagement with the recess 32 when the teeth of the latch are engaged with the teeth of the member. However, outward swinging of the latch moves the recess into alinement with the ball, whereby said latch will be held in such outward position until manually swung inwardly. Since the members 19 and 20 are of identical construction and are connected in the same manner, it is manifest that one member may not be moved relative to the other member without also moving the latter and that the corresponding ends of said members are always equally spaced from the center of the device 10. Although it is necessary to swing both latches 25 outwardly in order to move the inner ends of the members toward each other, attention is directed to the fact that the outwardly-directed teeth 24 and 26 permit said inner ends to be moved away from each other without manual outward swinging of said latches.

For moving the members 19 and 20 relative to each other, a gear or sprocket 34 is interposed between the contiguous surfaces of said members at the intermediate portion thereof. The gear is keyed or otherwise secured to a transverse shaft 35 and has its teeth in constant with the teeth of opposed gear racks 36, one of which is formed in the contiguous surface of each member by suitably recessing the medial portion of said surface. A substantially coextensive flange 37 is formed along each side of each gear rack 36 for maintaining the gear 34 in engagement therewith. These flanges are preferably made integral with their respective members as are the gear racks. As shown in Figures 2, 6 and 7, a hand wheel 38 is carried by one end of the shaft 35 for manually rotating the gear 34. A clockwise rotation of the gear will move the member 19 to the left and the member 20 to the right or from the position shown in Figure 3 toward the position shown in Figure 4. In order to move the members in the reverse direction, the gear must be rotated in an opposite or counter-clockwise direction after the latches 25 have been swung to their outward position. Thus, it is obvious that the length of the device 10 may be adjusted by manual rotation of the wheel 38 which moves the members 19 and 20 relative to each other.

The construction described hereinbefore permits manual adjustment of the device 10 so as to shorten or lengthen the equalizer rod 11. However, it is desirable to automatically shorten the length of the equalizer rod during use or operation thereof so as to compensate for wear of the brake shoes and prevent overthrow of the piston 12. In order to accomplish this automatic adjustment, an annular ratchet gear or wheel 39 is keyed or otherwise secured to the projecting portion of the shaft 35 opposite the wheel 38 and is adapted to have its teeth engaged by the teeth of a complementary ratchet wheel or gear 40. As is clearly shown in Figure 6, the ratchet wheel 40 is journaled upon the shaft 35 beyond the ratchet wheel 39 and is made integral with or otherwise carried by an elongate, flat arm or lever 41 which has a suitable opening adjacent one end thereof for receiving the shaft. A nut 42 is screw-threaded upon the outer end of the shaft and a coiled or helical spring 43 is confined upon said shaft between the nut and the arm 41 for maintaining the teeth of the ratchet wheels in engagement. The free end of the arm 41 engages within a slotted keeper member or eye-bolt 44 which is adjustably connected to an angular bracket 45 by having one end thereof reduced and screw-threaded as shown at 46 and extending through a slot 47 formed in one leg of the bracket. A pair of nuts 48 are carried by the screw-threaded portion of the eye-bolt for clamping the bracket leg therebetween and adjustably maintaining said eye-bolt in a fixed position. The other leg of the bracket 45 is provided with a slot 49 so as to permit connection of said bracket to the underside of a railroad car. A coiled or helical spring 50 connects the end of the arm 41 adjacent the shaft 35 to the elongate leg of an angular bracket 51, the short leg of which bracket is provided with a slot 52 to permit fastening of said bracket to the underside of the railroad car. As shown in Figure 2 the spring 50 maintains the arm 41 at an inclination when the equalizer rod 11 is stationary or in its non-operating position. Upon longitudinal movement of the rod to the right as shown in Figure 1, the device 10 will be moved in a similar direction so as to pivot the arm about the shaft 35 in counter-clockwise direction to a position substantially at a right angle relative to said device. If the arm 41 is mounted vertically relative to the railroad car, said arm will be in a substantially vertical position upon movement of the equalizer rod and adjusting device to the right.

As is clearly shown in Figures 7 and 8, the teeth of the ratchet wheels 39 and 40 extend in a clockwise direction so that said ratchet wheel 40 may rotate counter-clockwise relative to said ratchet wheel 39 upon movement of the equalizer rod and adjusting device to the right or forwardly. This counter-clockwise rotation of the ratchet wheel 40 is caused by the pivoting of the arm 41 to which said ratchet wheel is rigidly connected. Upon each forward movement of the equalizer rod, the teeth of the ratchet wheel 40 will ride in a counter-clockwise direction upon the teeth of the ratchet wheel 39 so as to force or spread said ratchet wheels apart (Figs. 7 and 8). When the equalizer rod returns to its original left-hand position, the teeth of the ratchet wheel 40 will move back into engagement with the teeth of the ratchet wheel 39 as shown in Figures 2 and 6. The spreading or forcing apart of the ratchet wheels is permitted by the resilient, rotatable mounting of the arm 41 and said arm is returned to its original or inclined position by the tension of the spring 50. It is pointed out that the slotted keeper or eye-bolt 44 has a width greater than the thickness of the arm, thereby permitting movement of said arm longitudinally of the shaft 35 and spreading of the ratchet wheels.

In the event that the throw of the piston 12 exceeds a predetermined distance due to wear of the brake shoes or other failure, the longitudinal movement of the equalizer rod 11 and device 10 will also be excessive. This excessive movement will pivot the arm 41 in a counter-clockwise direction beyond the position shown in Figure 8 and thereby rotate the teeth of the ratchet wheel 40 in the same direction beyond the teeth of the ratchet wheel 39. In other words, each tooth of the first ratchet wheel will ride up upon and then over the adjacent clockwise tooth of the second or other ratchet wheel. When the brakes are released so as to return the piston 12, the equalizer rod 11 and the device 10 to their original or non-operating positions, which is in a left-hand direction (Figs. 1 and 2), the arm 41 and its ratchet wheel 40 will be rotated in a clockwise direction by the tension of the spring 50 as has been explained. Since the relation of the teeth of the ratchet wheel 40 to the teeth of the ratchet wheel 39 has been altered due to the previous clockwise rotation of said first ratchet wheel, the subsequent clockwise rotation thereof will impart a similar movement to the other ratchet wheel. Manifestly, the member 19 will be moved toward the left and the member 20 toward the right by this clockwise rotation of the ratchet wheels due to a similar rotation of the shaft 35 and gear 34 and the engagement between said gear and the gear racks 36.

As has been explained, movement of the members is permitted by the resilient pivotal mounting of the latches 25, whereby the teeth 26 of said latches will ride or slide over the teeth 24 so as to move into engagement with different teeth. So long as the throw of the piston 12 is excessive, the device 10 will be actuated upon each application and release of the brakes in the manner hereinbefore described. However, when the equalizer rod has been shortened sufficiently to maintain the desired throw of the piston 12, the teeth of the ratchet wheel 40 will merely ride up but not over the teeth of the ratchet wheel 39 upon each operation of the brakes so as to render the device 10 inoperative. Attention is directed to the fact that the device is so constructed that only one ratchet tooth 24 of each member will be taken up by the teeth 26 of the latches 25 upon each movement of said members relative to each other irrespective of the amount of movement of the equalizer rod, because clockwise rotation of the ratchet wheel 40 is limited by the eye-bolt 44 restricting the pivotal movement of the lever 41. Of course, the device is inoperative when it reaches the position shown in Figure 4 and it is necessary to manually reset or adjust the same as has been hereinbefore fully explained.

It is readily apparent that a relatively simple device for automatically adjusting or taking up the slack in a braking system has been provided. The length of the equalizer rod is automatically shortened to compensate for wear of the brake shoes and thereby prevents overthrow of the piston. The device may be readily connected in any braking system and may be manually adjusted with little effort in a short period of time. It is noted that the brackets 45 and 51 may be secured to the underside of a railroad car so as to depend vertically therefrom or may be mounted so as to extend horizontally thereof. Although the slack adjusting device has been shown and described in connection with the braking system of a railroad car, it is obvious that said device may be used with any longitudinally reciprocal member which might need to be shortened due to wear of other mechanisms.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A slack adjusting device including, a pair of longitudinal members disposed in overlapping parallel relationship, the members being movable longitudinally relative to each other and being reciprocal longitudinally as a unit, means adjustably fastening said members in a fixed variable relation, a gear rack formed on each member, a gear interposed between and meshing with the gear racks for driving the same and moving the members relative to each other, the gear being reciprocal with said members, coacting ratchet means having connection with and reciprocal with said gear, one ratchet means being rotatable with the gear, means for limiting reciprocation of the other ratchet means so as to rotate the same relative to the first ratchet means upon such reciprocation, and means for resisting movement of said second ratchet means and for rotating the same in the opposite direction to its original position upon reverse reciprocation of the members, whereby excessive reciprocation will rotate the second ratchet means relative to the first ratchet means so that upon reverse reciprocation both ratchet means will be rotated in the opposite direction to turn the gear and drive the gear racks for moving said members relative to each other.

2. A slack adjusting device as set forth in claim 1 wherein the means for adjustably fastening the longitudinal members in a fixed variable relation include, latch means pivotally mounted upon the end of each member, and coacting means formed on each member for receiving the latch means of the other member, the pivotal mounting of said latch means permitting movement of the members relative to each other.

3. A slack adjusting device including, a pair of longitudinal members disposed in overlapping parallel relationship, the members being movable longitudinally relative to each other and being reciprocal longitudinally as a unit, means adjustably fastening said members in a fixed variable relation, a gear rack formed on each member, a gear interposed between and meshing with the gear racks for moving the members relative to each other, a ratchet wheel having connection and rotatable with the gear, a second ratchet wheel meshing with the first ratchet wheel, said gear and ratchet wheels being reciprocable with said members, means for limiting reciprocation of the second ratchet wheel so as to rotate the same relative to said first ratchet wheel upon such reciprocation, and means for resisting movement of said second ratchet wheel and for rotating the same in the opposite direction to its original position upon reverse reciprocation of the members, whereby excessive reciprocation will rotate the second ratchet wheel relative to the first ratchet wheel so that upon reverse reciprocation the ratchet wheels will be rotated in the opposite direction to turn the gear and drive the gear racks for moving said members relative to each other.

4. A slack adjusting device as set forth in claim 3 wherein the means for adjustably fastening the longitudinal members in a fixed variable relation include, latch means pivotally mounted upon the end of each member, and coacting means formed on each member for receiving the latch means of the other member, the pivotal mounting of said latch means permitting movement of the members relative to each other.

ERNEST A. JENKINS.